United States Patent [19]

Takao

[11] Patent Number: 5,379,104
[45] Date of Patent: Jan. 3, 1995

[54] METHOD OF, AND APPARATUS FOR, DETECTING OPTICAL AXIS OF HEADLAMP

[75] Inventor: Osamu Takao, Hiroshima, Japan

[73] Assignee: Chuo Electronic Measurement Co., Ltd., Hiroshima, Japan

[21] Appl. No.: 177,050

[22] Filed: Jan. 4, 1994

[51] Int. Cl.⁶ .......................................... G01M 11/06
[52] U.S. Cl. ............................... 356/121; 382/1
[58] Field of Search .................. 356/121; 33/288

[56] References Cited

U.S. PATENT DOCUMENTS 4,609,939  9/1986  Kozawa .................. 356/121
4,634,275  1/1987  Yoshida .................. 356/121

FOREIGN PATENT DOCUMENTS

57-179639  11/1982  Japan .
180122  8/1986  Japan ..................... 356/121

*Primary Examiner*—Richard A. Rosenberger
*Attorney, Agent, or Firm*—Jordan and Hamburg

[57] ABSTRACT

In a method of detecting optical axis of a headlamp, according to the present invention, an image of the light projected onto the screen is segmented grid by grid on the reference grid plane, a test window set in the reference grid plane is moved and the illuminance of the light incident upon a CCD corresponding to each grid in a test window B set in the reference grid plane is integrated each time the test window B is moved, and the center of the test window C when the integrated illuminance reaches a maximum value is detected as the optical axis position. According to the present invention, it is possible to positively detect an headlamp optical axis even if a plurality of hot zones exists.

4 Claims, 8 Drawing Sheets

METHOD OF, AND APPARATUS FOR, DETECTING OPTICAL AXIS OF HEADLAMP

BACKGROUND OF THE INVENTION

1. Field of the Invention

The present invention relates to a method of, and apparatus for, quantitatively detecting the optical axis of a headlamp of a vehicle such as automobile under inspection.

2. Prior-art Statement

For detecting the main optical axis of a headlamp of a car, for example, after assembled, it has been proposed to use a screen having illuminance sensors provided thereon and onto which a light is projected from the headlamp.

Recently, a wider variety of cars has adopt halogen lamps. In these circumstances, it has been proposed to detect the headlamp optical axis of a headlamp by picking up, by a TV camera or the like, a luminous intensity distribution pattern of a light projected onto such a screen, processing the light image, enclosing, by a line, an area of an illuminance having a greater value than a predetermined one to define an equiluminous contour, for example, and calculating a position of the center of gravity (centroid or center of figure) of the equiluminous contour and taking it as the main optical axis of the headlamp.

Figure 9:
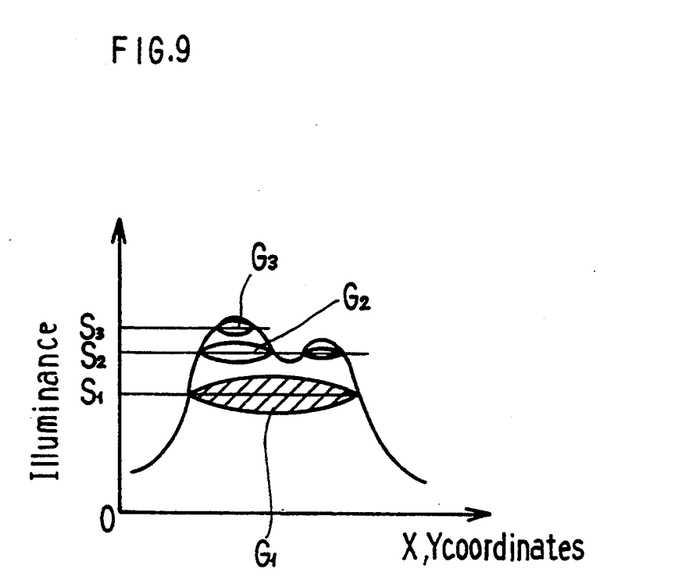
FIG. 9 is a graph showing the relationship between the X, Y coordinates and the illuminance when a plurality of hot zones exists.

When such conventional method is used to detect a main optical axis, however, the equiluminous contour will vary greatly depending upon the setting of an illuminance which is a reference for definition of the equiluminous contour so that a plurality of so-called hot zones is likely to be set, resulting in a possibility that an optical axis position to be set will deviate greatly from its due position, as shown in FIG. 9. That is, as shown in FIG. 9, when an equiluminous contour is defined with reference to the illuminance $S_1$, for example, the center of gravity $G_1$ coincides nearly precisely with the optical axis position. However, if an equiluminous contour is defined with reference to the illuminance $S_2$, for example, two hot zones will be set. Also, if an equiluminous contour is defined with reference to the illuminance $S_3$, the center of gravity $G_3$ will greatly deviate from the optical axis position. In these cases, the position of the center of gravity may not be regarded as the optical axis position, so it is difficult to detect the headlamp optical axis with a high accuracy.

SUMMARY OF THE INVENTION

Accordingly, it is an object of the present invention to overcome the above-mentioned drawbacks of the prior art by providing a method of, and apparatus for, positively detecting the optical axis of a headlamp even if a plurality of hot zones exists.

The above object is accomplished by providing a method of detecting a headlamp optical axis, comprising the steps off picking up, by an imaging means, an image of a light emitted from a vehicle lamp under inspection and projected onto a screen placed in front of the vehicle; forming, and storing, on a reference plane segmented into a plurality of grids a luminous intensity distribution curve corresponding to an illuminance pattern of the light image picked up by the imaging means; setting, moving and scanning a test window occupying a predetermined area in the reference grid plane to calculate an integrated illuminance in the test window; and selecting and detecting as the position of the headlamp optical axis the center of the test window when the integrated illuminance reaches a maximum value.

Also, the above object is accomplished by providing another method of quantitatively detecting the optical axis of a headlamp in an inspection line of vehicles such as automobiles, comprising the steps of: picking up an image of a light emitted from a vehicle lamp under inspection and projected onto a screen placed in front of the vehicle; forming, and storing, on a reference plane segmented into a plurality of grids a luminous intensity distribution curve corresponding to an illuminance pattern of the picked-up light image; setting, and moving and scanning a test window occupying a predetermined minimum area in the reference grid plane to calculate an integrated illuminance in each test window; setting as a provisional position of the headlamp optical axis the center of the test window position when the integrated illuminance reaches a maximum value; setting, and moving and scanning a test window occupying an area wider than the above minimum area to calculate an integrated illuminance in each test window; setting as another provisional position of the headlamp optical axis the center of the test window position when the integrated illuminance reaches a maximum value; and comparing these provisional positions of the headlamp optical axis with each other and determining the latter provisional position of the headlamp optical axis as the final optical axis position when the difference between the two provisional positions of the headlamp optical axis is within a permissible range.

Further, the above object is also accomplished by providing a method of quantitatively detecting the optical axis of a headlamp in an inspection line of vehicles such as automobiles, comprising the steps of: picking up an image of a light emitted from a vehicle lamp under inspection and projected onto a screen placed in front of the vehicle; forming, and storing, on a reference plane segmented into a plurality of grids a luminous intensity distribution curve corresponding to an illuminance pattern of the picked-up light image; setting, and moving and scanning a test window occupying a predetermined maximum area in the reference grid plane to calculate an integrated illuminance in each test window; setting as a provisional position of the headlamp optical axis the center of the test window position when the integrated illuminance reaches a maximum value; setting, and moving and scanning a test window occupying an area narrower than the above maximum area to calculate an integrated illuminance in each test window; setting as another provisional position of the headlamp optical axis the center of the test window position when the integrated illuminance reaches a maximum value; and comparing these provisional positions of the headlamp optical axis with each other and determining the former provisional position of the headlamp optical axis as the final optical axis position when the difference between the two provisional positions of the headlamp optical axis is beyond a permissible range.

Also the above object is accomplished by providing an apparatus for detecting the optical axis of a headlamp, comprising: a means of picking up a light emitted from a vehicle lamp under inspection and projected onto a screen placed in front of the vehicle; a means of forming, and storing, on a reference plane segmented into a plurality of grids a luminous intensity distribution curve corresponding to an illuminance pattern of the light image picked up by the imaging means; and a means of setting, and moving and scanning a test window occupying a predetermined area in the reference grid plane to calculate an integrated illuminance in the test window while detecting the center of the test window when the integrated illuminance reaches a maximum value, and to select it as the position of the headlamp optical axis.

DETAILED DESCRIPTION OF THE PREFERRED EMBODIMENTS

These and other objects and advantages will be better understood from the ensuing description made, by way of example, of the embodiments of the present invention with reference to the drawings.

Figure 1:
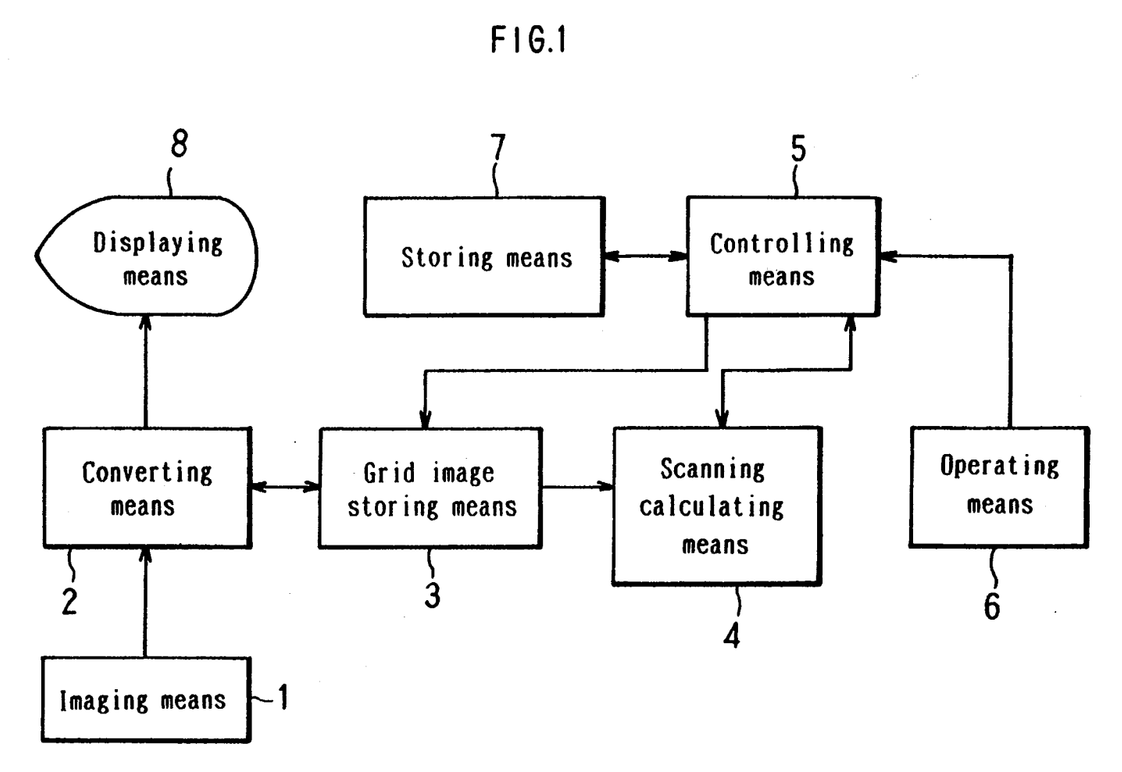
FIG. 1 shows the configuration of the headlamp testing system in which the optical axis detecting apparatus according to the present invention is utilized.
Figure 2:
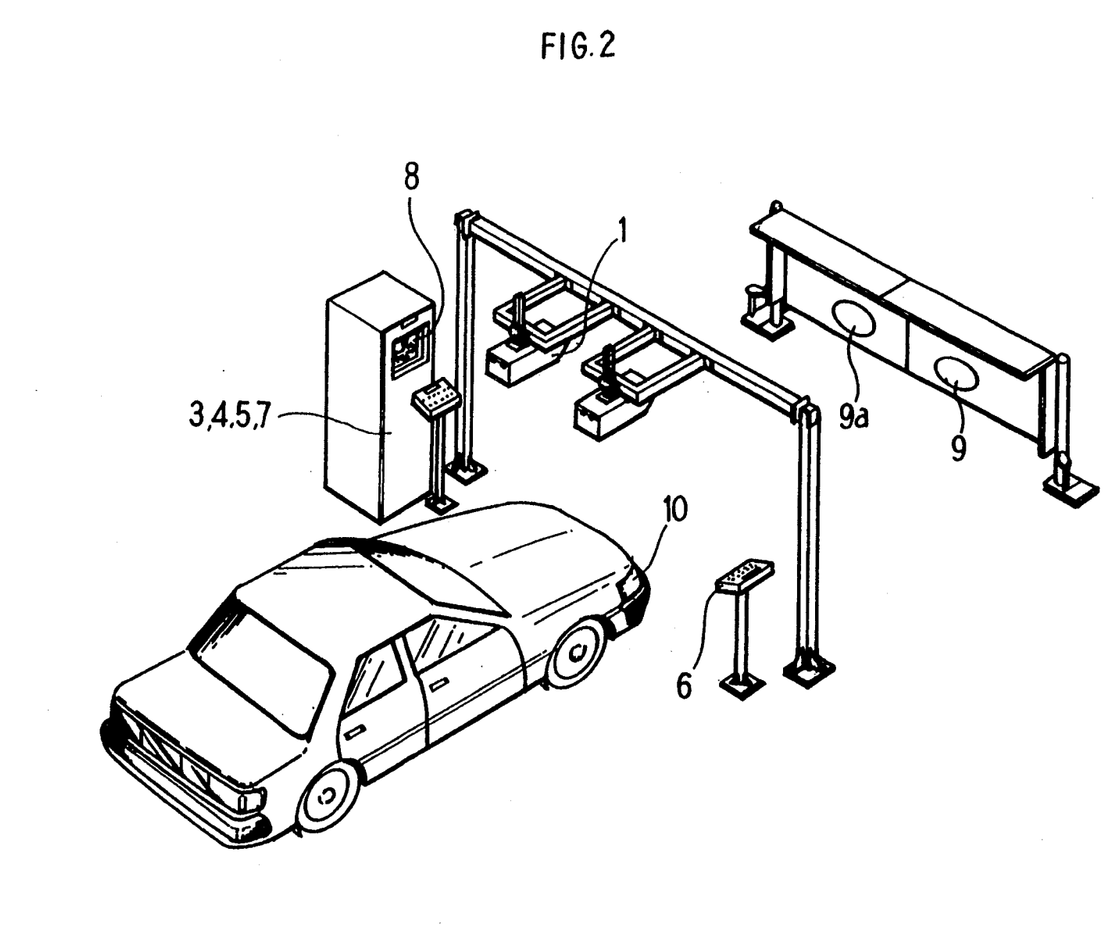
FIG. 2 is a perspective view of the headlamp testing system in FIG. 1.

FIG. 1 shows a headlamp testing system in which the headlamp optical axis detecting apparatus according to the present invention is utilized. The headlamp testing system comprises a headlamp optical axis detecting apparatus consisting of an imaging means 1, converting means 2, grid image storing means 3, scanning/calculating means 4, and a controlling means 5, an operating means 6, storing means 7 and displaying means 8.

The operating means 6 is intended for setting an appropriate position of a headlamp optical axis for each automobile under inspection. The storing means 7 is adapted to store such an appropriate position of optical axis for each automobile under inspection. The displaying means 8 is so designed as to display simultaneously on a CRT screen thereof both the an appropriate position of optical axis stored for each automobile under inspection and a position of optical axis detected by the optical axis detecting apparatus, for visual check of any difference between these positions.

The imaging means 1 picks up an image of the light emitted from the headlamp of an automobile under inspection and projected onto a screen 9 placed in front of the automobile. In this embodiment, the imaging means I is a TV camera using CCDs (charge coupled device) each of which detects the light reflected from the screen 9 and delivers a signal corresponding to the intensity of the detected light. Note that the imaging means 1 is connected to inputs of the grid image storing means 3 and displaying means 8, respectively, by means of the converting means 2.

The converting means 2 converts an analog signal delivered from the imaging means 1 to a digital signal, and converts a digital signal delivered from the grid image storing means 3 to an analog signal. It is connected at the input thereof to the output of the imaging means 1 and at the output thereof to the input of the displaying means 8. Also the converting means 2 is connected to the grid image storing means 3.

Figure 3:
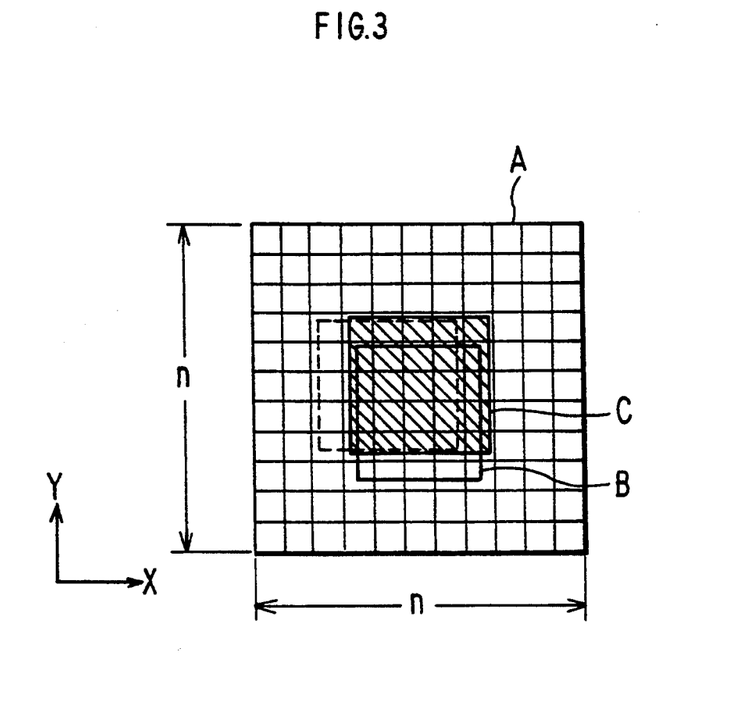
FIG. 3 is an explanatory drawing showing the reference grid plane A and test window B used in the method of optical axis detection according to the present invention.

The grid image storing means 3 forms on a reference grid plane A segmented into a plurality of predetermined grids as shown in FIG. 3 a luminous intensity distribution corresponding to the illuminance pattern of the light image picked up by the imaging means 1, and temporarily stores the luminous intensity distribution. In this embodiment, the reference grid plane is composed of as many grids (n grids along vertical axis (X) and along horizontal axis (Y), respectively) as the CCDs provided in the TV camera used as the imaging means 1. The grid image storing means 3 is connected at the output thereof to the input of the scanning/calculating means 4 and at the input thereof to the output of the controlling means 5.

The scanning/calculating means 4 is adapted to set a test window B occupying a predetermined area in the reference grid plane A as shown in FIG. 3, scan the test window B vertically and horizontally within the reference grid plane A (the illuminance thus integrated will be referred to as "integrated illuminance" hereinafter), and to consecutively integrate at each scan the illuminance of each grid corresponding to each pixel of the light image in the set test window B. Also the scanning/calculating means 4 detects the center of the test window C when the integrated illuminance reaches a maximum value, sets it as the position of optical axis, and delivers to the controlling means 5 connected to the output thereof a detection signal corresponding to the set position of optical axis.

Figure 4:
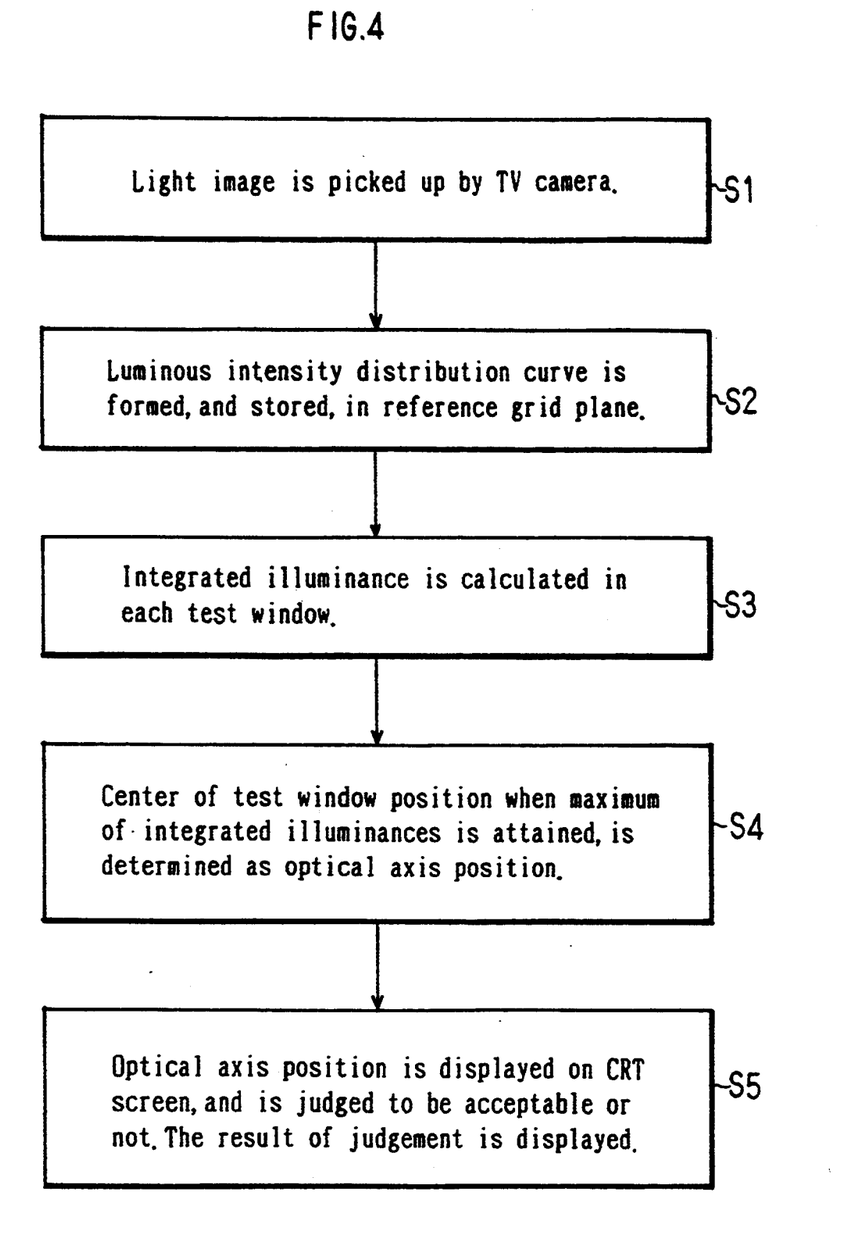
FIG. 4 is a flow chart showing a method of optical axis detection according to the present invention.

Next, an automobile headlamp will be inspected as follows by the method of optical axis detection using the aforementioned embodiment of the optical axis detecting apparatus. The process of this inspection will be described below with reference to the flow chart in FIG. 4:

(I) First, an automobile is placed in front of the screen 9 for the headlamps thereof to be opposite to the screen 9. Next the type and other data of the automobile under inspection are to be keyed in at the operating means 6. Based on these data, an appropriate position of optical axis is selected and stored as reference data into the storing means 7. Thereafter the light is projected from the headlamp onto the screen 9. A light spot 9a thus formed on the screen 9 is picked up by the TV camera used in the imaging means 1. (Step S1)

Figure 5:
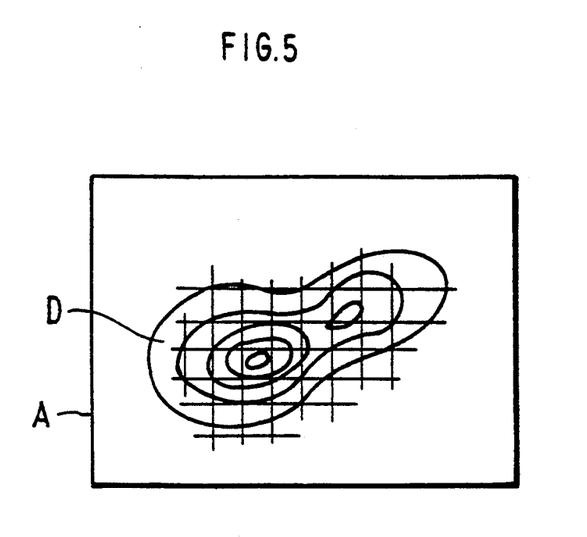
FIG. 5 is an explanatory drawing showing the test window according to the present invention.

(II) Then, a signal indicative of a luminous intensity distribution corresponding to an illuminance pattern of the light spot (light image) picked up by the TV camera and which corresponds to the illuminance of the light incident upon each CCD of the TV camera is delivered via the converting means 2 to the grid image storing means 3 and displaying means 8. Thus the light spot is displayed on the CRT screen of the displaying means 8. The grid image storing means 3 having received the above signal forms a luminous intensity distribution curve D shown in FIG. 5 on the reference grid plane A shown in FIG. 4, and temporarily stores it until completion of the optical axis detection. (Step S2)

(III) Next, the scanning/calculating means 4 scans the test window B shown in FIG. 6 grid by grid vertically and horizontally within the reference grid plane A, and calculates at each scan a sum of the illuminances $I_{11}$ to $I_{55}$ of the light incident upon a CCD corresponding to each grid within the set test window B, namely, an integrated illuminance as shown below (Step S3):

$$I = \sum_{i,j=1}^{5} I_{ij}$$

Figure 6:
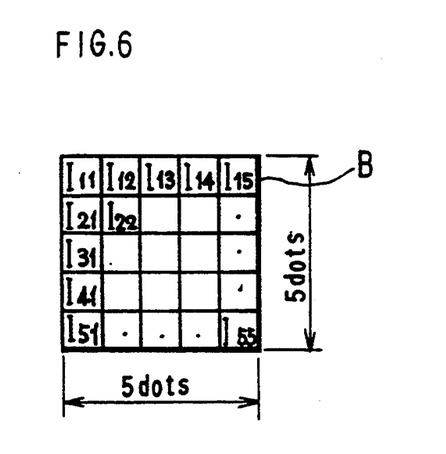
FIG. 6 is an explanatory drawing showing the luminous intensity distribution curve formed on the reference grid plane according to the present invention.

Note that according to this embodiment, the test window B is set to have a vertical and horizontal dimensions each equivalent to 5 (pixels) as shown in FIG. 6.

(IV) Furthermore, the scanning/calculating means 4 detects the center of the test window B when the integrated illuminance at each position and obtained at the step (VI) above reaches a maximum value, determines the position (X, Y) as the position of optical axis, and delivers a signal corresponding to the optical axis position to the controlling means 5 in order to display the position on the CRT screen of the displaying means 8. (Step S4)

(V) The controlling means 5 having received the above signal delivers a predetermined video signal through the converting means 2 to the displaying means 8, and the detected position of optical axis is displayed on the CRT screen of the displaying means 8 having received the predetermined video signal. The appropriate position of optical axis stored as reference data at Step S1 is compared with the detected position of optical axis. If it is within a predetermined range, the detected optical axis position is determined to be acceptable. If not, it is determined to be rejected. Any way, the result of the acceptability determination is displayed on the CRT screen. (Step S5)

Figure 7:
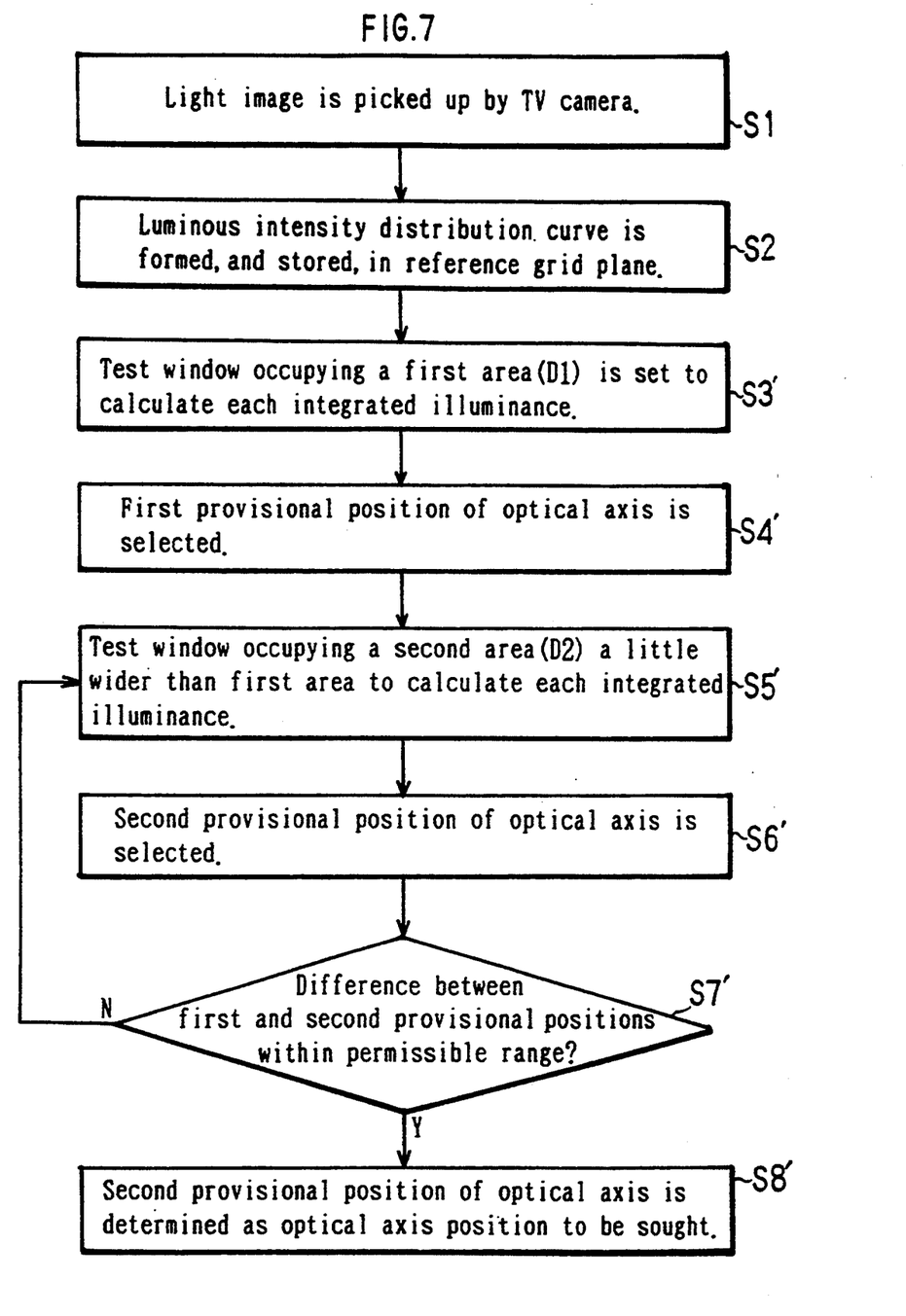
FIG. 7 is a flow chart showing another method of optical axis detection according to the present invention.

Next, another method of optical axis detection according to the present invention will be discussed below with reference to the flow chart in FIG. 7. Since the Steps S1 and S2 for the second method of optical axis detection are the same as those for the aforementioned first method as shown in FIG. 7, and so no further description of them will be given below.

(III) A test window occupying a preset minimum necessary area (first area D1), for example, an area equivalent to a minimum of 2 pixels for each of vertical and horizontal dimensions (2×2=4 pixels), is set, and moved and scanned to calculate an integrated illuminance in each scanned position (test window position). (Step S3')

(IV) Of the test window showing the maximum one of the integrated illuminances calculated at Step S3', the center is selected as a first provisional position of optical axis R1. (Step S4')

(V) A test window occupying a second area (D2) somewhat wider than the first area D1 set at Step S3', for example, an area one to several dots wider in both vertical and horizontal dimensions than the first area D1, is set to calculate an integrated illuminance in each scanned test window position as at Step S3'. (Step S5')

(VI) Of the test window showing the maximum one of the integrated illuminances calculated at Step S5', the center is selected as a second provisional position of optical axis R2. (Step S6')

(VII) Then, the provisional positions of optical axis R1 and R2 are compared with each other. It is judged whether the difference between them is within a predetermined range Z. Namely, a calculation is made of the following (Step 7'):

$$|R1-R2|<Z$$

If the requirement $|R1-R2|<Z$ is found not met at this Step S7', the operation will go to Step S8'.

(VIII) The last provisional position of optical axis, namely, R2 in this case, is determined as the final position of optical axis to be sought. (Step S8')

(IX) If the requirement $|R1-R2|<Z$ is not met at Step S7', the operation will be back to Step S5' at which a test window occupying a still wider third area than that of the second area will be set and a similar operation is repeatedly done. When the N-th provisional position of optical axis $R_N$ and (N+1)th provisional position of optical axis $R_{N+1}$ meet the following requirement, the inspection and operation are terminated and the last position of optical axis $R_{N+1}$ is determined as the final position of optical axis to be sought:

$$|R_N-R_{N+1}|<Z$$

Figure 8:
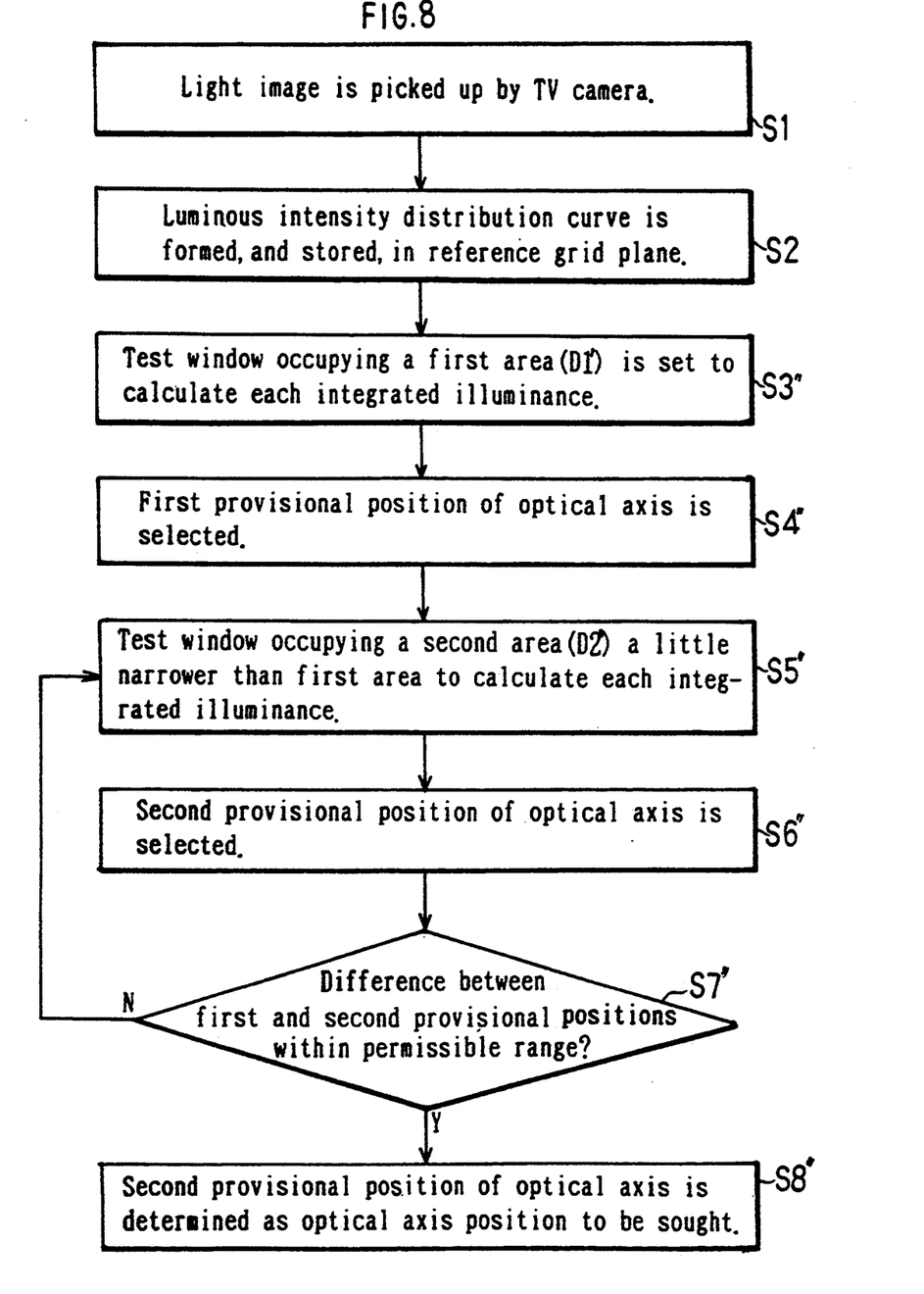
FIG. 8 is also a flow chart showing a still another method of optical axis detection according to the present invention.

Furthermore, a still another method of optical axis detection according to the present invention will be described below with reference to the flow chart in FIG. 8. Note that the Steps S1 and S2 for this third method are the same as those for the aforementioned first and second methods, and so no further description will be made of these first and second steps.

(III) A test window occupying a preset maximum area (first area D1'), for example, an area having a vertical and horizontal dimensions each equivalent to about a half of each of the vertical and horizontal dimensions of the reference grid plane, is set, and moved and scanned to calculate an integrated illuminance in each scanned position (test window position). (Step S3")

(IV) Of the test window showing the maximum one of the integrated illuminances calculated at Step S3", the center is selected as a first provisional position of optical axis R1'. (Step S4")

(V) A test window occupying a second area (D2') somewhat narrower than the first area D1' set at Step S3", for example, an area one to several dots narrower in both vertical and horizontal dimensions than the first area D1', is set to calculate an integrated illuminance in each scanned test window position as at Step S3". (Step S5")

(VI) Of the test window showing the maximum one of the integrated illuminances calculated at Step S5", the center is selected as a second provisional position of optical axis R2'. (Step S6")

(VII) Then, the provisional positions of optical axis R1' and R2' are compared with each other. It is judged whether the difference between them is within a predetermined range Z'. Namely, a calculation is made of the following (Step 7"):

$$|R1'-R2'|<Z'$$

If the requirement $|R1-R2|<Z$ is found not met at this Step S7", the operation will go to Step S8'.

(VIII) The first provisional position of optical axis, namely, R1' in this case, is determined as the final position of optical axis to be sought. (Step S8")

(IX) If the requirement $|R1-R2|<Z$ is not met at Step S7", the operation will be back to Step S5" at which a test window occupying a still narrower third area than that of the second area will be set and a similar operation is repeatedly done. When the N-th provisional position of optical axis $R_{N'}$ and (N+1)th provisional position of optical axis $R_{N+1'}$ meet the following requirement, the inspection and operation are terminated and the last position of optical axis $R_{N+1'}$ is determined as the final position of optical axis to be sought:

$$|R_{N'} - R_{N+1'}| < Z'$$

As having been described in the foregoing, in the method of detecting a headlamp optical axis according to the present invention, an image of the light projected onto the screen is segmented grid by grid on the reference grid plane, a test window set in the reference grid plane is moved and the illuminance of an image of the light incident upon a CCD corresponding to each grid in a test window set in the reference grid plane is integrated each time the test window is moved, and the center of the test window when the integrated illuminance reaches a maximum value is detected as the optical axis position. Therefore, it is possible to positively and nearly accurately detect the optical axis even if a plurality of so-called hot zones is formed in the luminous intensity distribution.

What is claimed is:

1. A method of quantitatively detecting the optical axis of a headlamp in an inspection line of vehicles such as automobiles, comprising the steps of:
    picking up an image of a light emitted from a vehicle lamp under inspection and projected onto a screen placed in front of the vehicle;
    forming, and storing, on a reference plane segmented into a plurality of grids a luminous intensity distribution curve corresponding to an illuminance pattern of the picked-up light image;
    setting, and moving and scanning a test window occupying a predetermined area in the reference grid plane to calculate an integrated illuminance of each unit area in each test window; and
    selecting and detecting as the position of the headlamp optical axis the center of the test window when the integrated illuminance reaches a maximum value.

2. A method of quantitatively detecting the optical axis of a headlamp in an inspection line of vehicles such as automobiles, comprising the steps of:
    picking up an image of a light emitted from a vehicle lamp under inspection and projected onto a screen placed in front of the vehicle;
    forming, and storing, on a reference plane segmented into a plurality of grids a luminous intensity distribution curve corresponding to an illuminance pattern of the picked-up light image;
    setting, and moving and scanning a test window occupying a predetermined minimum area in the reference grid plane to calculate an integrated illuminance in each test window;
    setting as a provisional position of the headlamp optical axis the center of the test window position when the integrated illuminance reaches a maximum value;
    setting, and moving and scanning a test window occupying an area wider than the above minimum area to calculate an integrated illuminance in each test window;
    setting as another provisional position of the headlamp optical axis the center of the test window position when the integrated illuminance reaches a maximum value; and
    comparing these provisional positions of the headlamp optical axis with each other and determining the latter provisional position of the headlamp optical axis as the final optical axis position when the difference between the two provisional positions of the headlamp optical axis is within a permissible range.

3. A method of quantitatively detecting the optical axis of a headlamp in an inspection line of vehicles such as automobiles, comprising the steps of:
    picking up an image of a light emitted from a vehicle lamp under inspection and projected onto a screen placed in front of the vehicle;
    forming, and storing, on a reference plane segmented into a plurality of grids a luminous intensity distribution curve corresponding to an illuminance pattern of the picked-up light image;
    setting, and moving and scanning a test window occupying a predetermined maximum area in the reference grid plane to calculate an integrated illuminance in each test window;
    setting as a provisional position of the headlamp optical axis the center of the test window position when the integrated illuminance reaches a maximum value;
    setting, and moving and scanning a test window occupying an area narrower than the above maximum area to calculate an integrated illuminance in each test window;
    setting as another provisional position of the headlamp optical axis the center of the test window position when the integrated illuminance reaches a maximum value; and
    comparing these provisional positions of the headlamp optical axis with each other and determining the former provisional position of the headlamp optical axis as the rural optical axis position when the difference between the two provisional positions of the headlamp optical axis is beyond a permissible range.

4. An apparatus for quantitatively detecting the optical axis of a headlamp in an inspection line of vehicles such as automobiles, comprising:
    a means of picking up a light emitted from a vehicle lamp under inspection and projected onto a screen placed in front of the vehicle;
    a means of forming, and storing, on a reference plane segmented into a plurality of grids a luminous intensity distribution curve corresponding to an illuminance pattern of the light image picked up by the imaging means; and
    a means of setting, and moving and scanning a test window occupying a predetermined area in the reference grid plane to calculate an integrated illuminance in the test window while detecting the center of the test window when the integrated illuminance reaches a maximum value and to select it as the position of the headlamp optical axis.

* * * * *